Dec. 25, 1934. J. C. FORTUNE 1,985,367
DRIVE FOR DRILL PIPE
Filed May 9, 1933 2 Sheets-Sheet 1
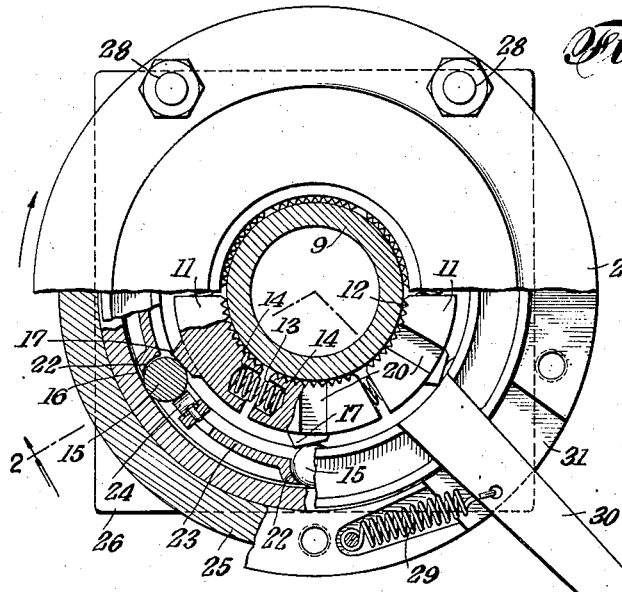
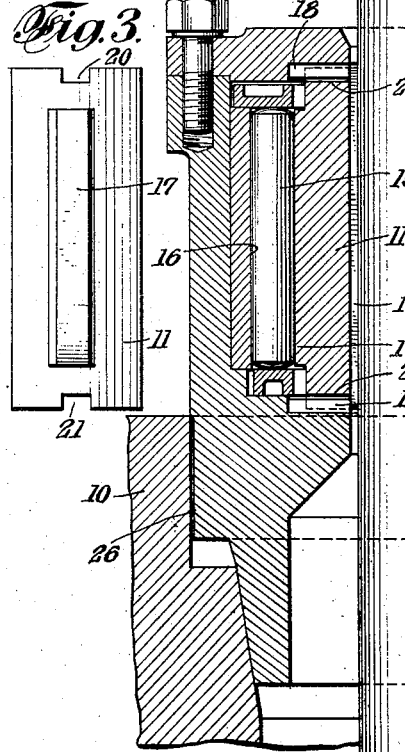
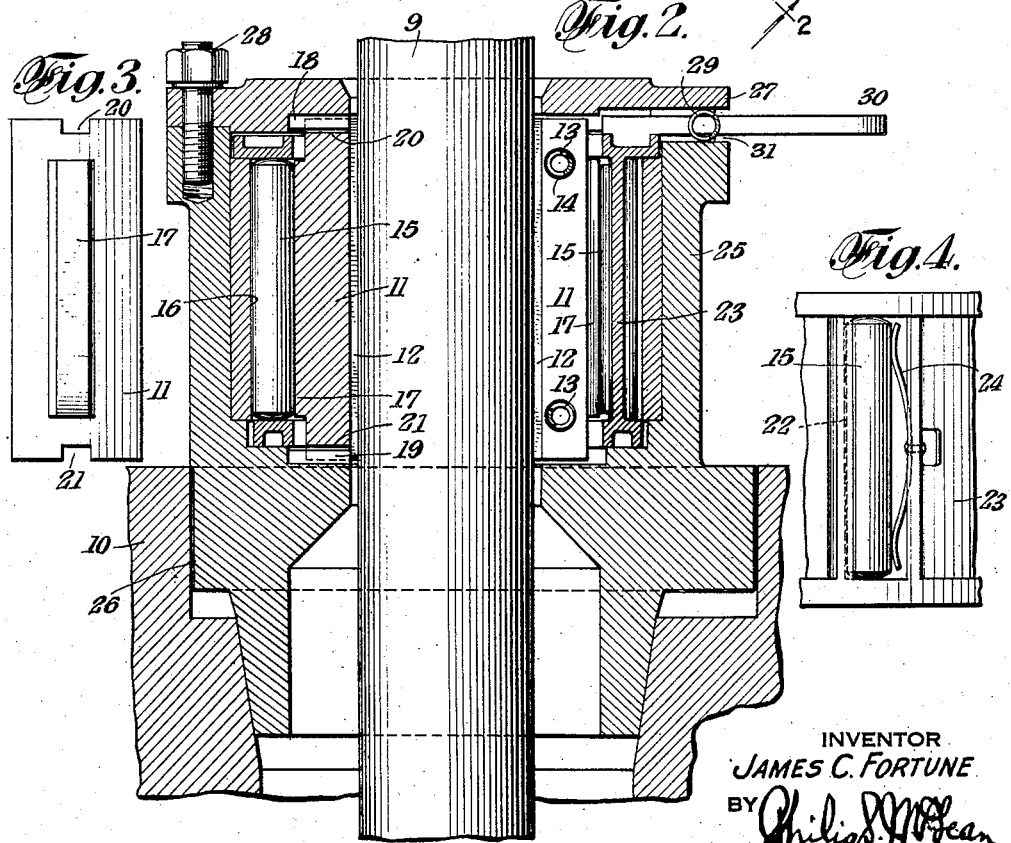
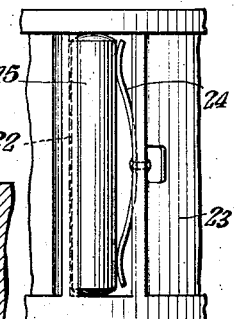
INVENTOR
JAMES C. FORTUNE
BY
ATTORNEY

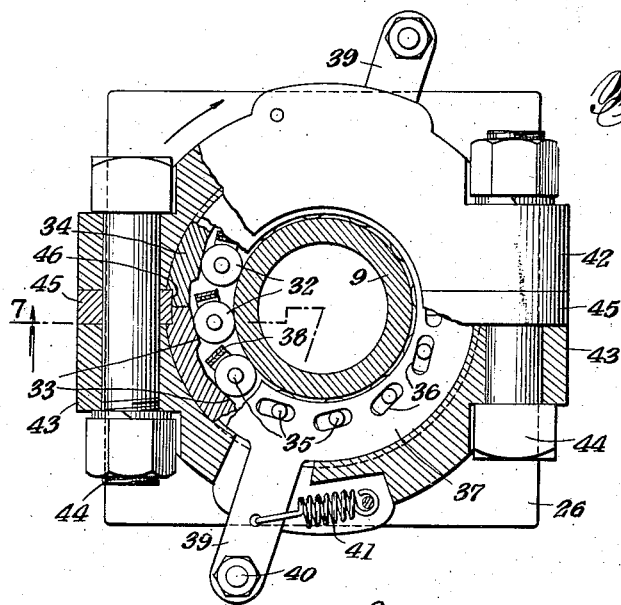
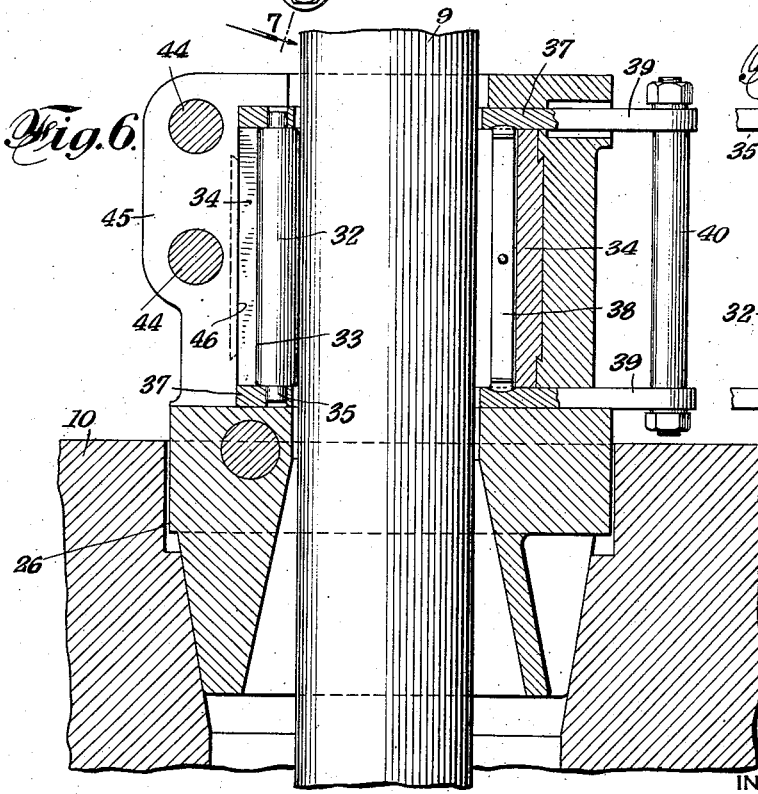

Patented Dec. 25, 1934

1,985,367

UNITED STATES PATENT OFFICE 1,985,367

DRIVE FOR DRILL PIPE

James C. Fortune, Monterey, Calif.

Application May 9, 1933, Serial No. 670,128

9 Claims. (Cl. 255—23)

This invention relates to the driving of the pipe used in rotary drilling.

In drilling deep wells, considerable torque is accumulated and released in the drill string, creating at times dangerous and objectionable conditions. Thus when the bit encounters an obstruction at the bottom of the hole, it may be held against rotation while the rotary table at the top of the hole continues to rotate until the torque has traveled the full length of the pipe. Where the pipe is keyed to the table by a square kelly, as at present, when the rotary table clutch is thrown out, the pipe in untwisting may impart sufficient energy to the heavy table to cause it, acting as a fly wheel, to continue in reverse rotation far enough to unscrew the pipe in the hole.

Special objects of the invention are to provide a practical and desirable form of drive in which the aforementioned and other possible difficulties and objections are eliminated.

A further object is to obviate the need for the square kelly and to enable the drive to be effected by direct engagement with the pipe.

Additional objects and the novel features of construction, combinations and relations of parts by which the same are attained, will appear as the specification proceeds.

In the drawings accompanying and forming part of the specification, certain preferred embodiments of the invention are illustrated, but it is to be understood that the structure may be modified and changed as regards the present disclosure, within the true intent and broad scope of the invention.

Fig. 1 is a broken plan and part sectional view of an embodiment of the invention in the form of a bushing adapted to be set in a rotary table and showing the drill pipe as held by the device.

Fig. 2 is a broken vertical sectional view substantially as on line 2—2 of Fig. 1 and illustrating portions of both the table and the pipe.

Fig. 3 is a back view of one of the pipe gripping segments.

Fig. 4 is a fragmentary view showing one of the clutch rollers and part of the cage structure for these rollers.

Figs. 5 and 6 are broken plan and vertical sectional views similar to Figs. 1 and 2, illustrating a modified form of the invention, Fig. 6 being taken as on substantially the plane of line 6—6 of Fig. 5.

Fig. 7 is a fragmentary detail of the cage and roller structure in the second form of the invention.

In the several views, the drill pipe is designated 9, and a rotary table is indicated at 10.

In the present invention, the drive from the table to the pipe is effected through a one-way drive clutch and slip connection.

In the form of the invention first illustrated, Figs. 1 to 4, the pipe is engaged by a series of segmental blocks 11, shown as having gripping faces 12, corrugated longitudinally to permit sliding feeding movement of the pipe. These segmental grips are shown as thrust apart by springs 13, seated in opposing sockets 14 in the ends of the box, so as to be self-releasing.

The setting of the grips on the pipe is effected in the illustration by the action of rollers 15, confined at the outside by a circular track 16 and engaging at their inner sides the cam or wedge elements 17, on the outer faces of the grip blocks.

The structure described is in the nature of a one-way roller clutch, it being noted that with rotation of the roll confining track in the direction of the arrow in Fig. 1, the rollers 15 will be driven up the inclines 17, to force the segmental blocks into gripping engagement with the pipe and that upon reverse rotation, the track 16 will ride the rollers down the inclines, permitting the springs 13 to force the grip segments apart and free them from gripping engagement with the pipe.

The grip blocks are located and guided at top and bottom by radial keys 18, 19, engaging in radial grooves 20, 21, in the upper and lower ends of the blocks. The rollers are similarly spaced to coact properly with the wedge inclines by being disposed in seats 22, in a roller cage 23, bowed springs 24 in said cage holding the rollers yieldingly positioned in their seats, Fig. 4.

The entire roller clutch construction is shown mounted in and carried by a substantial bushing 25, seated in the square or other angular socket of the table as at 26, Fig. 2. This bushing is shown as closed at the top, over the roller clutch parts by cover plate 27, removably secured in place by bolts 28, and the radial keys 18, 19, are shown as carried respectively by oppositely disposed portions of the cover plate and bushing.

The clutch rollers are held normally engaged with the wedge faces in the illustration, through the medium of a spring 29, acting to turn the roller cage in a clutch engaging direction, said spring being shown in Fig. 1, as connected between the bushing or base structure and a lever extension 30, projecting radially from the roller cage. This lever is indicated as projecting through a segmental passage 31, beneath the cover plate far enough to serve as a handle by which the roller cage may be turned, against the tension of spring 29, to withdraw the rollers from the wedge faces and thereby release the grips.

The second form of the invention illustrated in Figs. 5, 6, 7, embodies a roller clutch form of drive, but differs from the first in that the rollers engage the pipe and serve directly as the gripping elements. The rollers in this instance, are designated 32 and are shown as disposed in a circular series between the pipe and the wedge face inclines 33, on the surrounding sectional clutch ring 34. A greater number of rollers are provided in this instance, to gain the desired grip on the pipe and these rollers are shown as having pintles 35, at their upper and lower ends engaged in guide slots 36, in the upper and lower cage rings 37. These slots are shown as inclined in substantial correspondence with the inclines of the wedge faces and bowed springs 38, are shown for thrusting the rollers in the cage in the pipe gripping direction.

The cage rings are shown as having radially projecting leverage extensions or arms 39, connected at the outer ends by spacing bolts 40 and a spring 41, is shown acting on this cage structure, urging it in a clutch roller engaging direction.

The bushing or mounting for the roller clutch assemblage is shown as made up in two halves or sections 42, 43, secured together by through bolts 44, and with key pieces 45, held between the parts and entered at 46, partly between the sections of the clutch ring 34, so as to securely key the latter within the supporting structure.

The operation of this second form of the invention will be seen to be substantially the same as that of the first, the rotation of the clutch ring in the direction of the arrow, Fig. 5, having the effect of setting the rollers into gripping engagement with the pipe, through the direct action, in this case, of the wedge inclines of the clutch ring. Rotation in the opposite direction automatically frees the rollers from gripping engagement with the pipe and similarly the rollers may be freed from holding engagement with the pipe by shifting the roller cage against the force of the cage shifting spring.

The invention makes it possible to drive the pipe directly instead of through a square kelly or the like, saving the expense and objectionable features attendant on the use of the latter and, because of the one direction form of drive, any reverse or untwisting movement of the pipe will not spin the table backward with the consequent possibilities of uncoupling the pipe, as described above in conjunction with the conventional square kelly form of drive. This one-way drive furthermore enables the pipe to feed through or to be withdrawn, as required. The clutching operation is effective only in the joint tightening direction of the pipe, making the table effective to rotate the pipe only in the direction which will tighten the joints and preventing the pipe in its reverse torque releasing movements from spinning the table in the joint uncoupling direction. Operation of the release lever of the clutch against the tension of the clutch setting spring enables the grip of the clutch to be readily reduced or released, as may be required.

The structure may be modified in various ways and the one-way slip drive clutch principle be utilized in different forms. Thus, if desired, the square kelly may be retained, for its slip drive features and the one-way drive be accomplished by interposing the roller clutch structure between the table and the square bushing through which the square kelly slides. In such event, a suitable key might be dropped into place between the two parts of the drive clutch for enabling the table to be used when desired, for unscrewing joints and other purposes. Other changes within the intent of the invention may appear herefrom or become apparent in the practical use of the invention. In both forms of the invention illustrated, the clutch parts are fully protected, but may, when desired, be readily inspected, in the first form, by removing the cover plate and in the second form by separating the two halves of the body or bushing. The several parts of the device are of simple design and of rugged form, capable of standing the hard treatment to which apparatus in the oil fields is usually subjected. The terms employed herein have been used in a descriptive, rather than in a limiting sense, except possibly for such limitations as may be imposed by the state of the prior art.

What is claimed is:

1. In combination with a rotary table, relatively separable pipe grips carried thereby and means automatically operative in the rotation of said table in one direction to force said separable pipe grips together into holding engagement with drill pipe extending through the table.

2. In combination, a rotary table, relatively separable pipe grips radially keyed to said table and wedging means automatically operative in the rotation of the table in one direction to force said relatively separable radially keyed grips into holding engagement with drill pipe extending through the table.

3. In combination, a rotary table, relatively separable pipe grips radially keyed to said table, wedging means automatically operative in the rotation of the table in one direction to force said relatively separable radially keyed grips into holding engagement with drill pipe extending through the table and means for effecting separation of said grips and reversal of said wedging action.

4. In combination, a rotary table, relatively separable pipe grips radially keyed to said table, wedging means automatically operative in the rotation of the table in one direction to force said relatively separable radially keyed grips into holding engagement with drill pipe extending through the table, means tending to separate said pipe grips and means for tensioning the wedging means in a grip closing relation.

5. In combination, a rotary table, relatively separable pipe grips radially keyed to said table, wedging means automatically operative in the rotation of the table in one direction to force said relatively separable radially keyed grips into holding engagement with drill pipe extending through the table, means tending to separate said pipe grips and means for tensioning the wedging means in a grip closing relation, including a releasing member shiftable in an opposite way to effect the release of the pipe grips.

6. A drive for rotary drill pipe, comprising a supporting structure, a roller cage shiftably mounted therein, rollers positioned by said cage, wedging faces in cooperative relation with said rollers and comprising inclined tracks on the back of pipe engaging blocks seated in the bushing.

7. A drive for rotary drill pipe, comprising a supporting bushing, pipe gripping segments keyed for radial movement in said bushing, spring means tending to separate said segments, a roller cage shiftably mounted in the bushing, rollers positioned by said cage in opposition to said segments and wedge faces in engagement with said rollers for effecting relative closing movement of the segments upon rotation of the bushing in one direction.

8. A drive for rotary drill pipe, comprising a supporting bushing, pipe gripping segments keyed for radial movement in said bushing, spring means tending to separate said segments, a roller cage shiftably mounted in the bushing, rollers positioned by said cage in opposition to said segments, wedge faces in engagement with said rollers for effecting relative closing movement of the segments upon rotation of the bushing in one direction and means by which the roller cage may be shifted in opposite directions to effect relative opening and closing movements of said pipe gripping segments.

9. In combination with a rotary table and pipe gripping means carried thereby, including rollers and cooperating wedging means, a rotary cage structure for said rollers shiftable with respect to the wedging means, spring means acting on said cage structure to effect engagement of the rollers and wedging means for effecting drive of the drill pipe with rotation of the table in one direction, said cage structure having means by which the same may be shifted contrary to the force of the spring means for releasing the pipe.

JAMES C. FORTUNE.